United States Patent [19]

Meier et al.

[11] Patent Number: 5,015,689

[45] Date of Patent: May 14, 1991

[54] UNSATURATED POLYESTER RESINS CONTAINING THERMOTROPIC POLYMERS, A PROCESS FOR THEIR PREPARATION AND THEIR USE FOR THE PRODUCTION OF MOULDED BODIES

[75] Inventors: Helmut-Martin Meier, Ratingen; Harald Pielartzik; Hermann Brinkmeyer, both of Krefeld, all of Fed. Rep. of Germany

[73] Assignee: Bayer Aktiengesellschaft, Leverkusen, Fed. Rep. of Germany

[21] Appl. No.: 423,516

[22] Filed: Oct. 13, 1989

Related U.S. Application Data

[63] Continuation of Ser. No. 142,453, Jan. 11, 1988, abandoned.

[30] Foreign Application Priority Data

Jan. 22, 1987 [DE] Fed. Rep. of Germany ....... 3701740

[51] Int. Cl.[5] .............................................. C08G 63/00
[52] U.S. Cl. .................................... 525/43; 525/445; 525/447
[58] Field of Search .......................... 525/43, 445, 447

[56] References Cited

U.S. PATENT DOCUMENTS

| | | | |
|---|---|---|---|
| 4,251,641 | 2/1981 | Arakawa et al. | 525/445 |
| 4,394,480 | 7/1983 | Ujikawa et al. | 525/43 |
| 4,438,236 | 3/1984 | Cogswell et al. | 525/445 |
| 4,451,611 | 5/1984 | Cincotta et al. | 525/444 |
| 4,489,190 | 12/1984 | Froix | 525/539 |
| 4,563,508 | 1/1986 | Cottis et al. | 525/444 |

FOREIGN PATENT DOCUMENTS

| | | |
|---|---|---|
| 0030417 | 6/1981 | European Pat. Off. . |
| 0169947 | 2/1986 | European Pat. Off. . |
| 52-109551 | 9/1977 | Japan . |
| 2078240 | 1/1982 | United Kingdom . |

*Primary Examiner*—Ana L. Carrillo
*Attorney, Agent, or Firm*—Connolly and Hutz

[57] ABSTRACT

Unsaturated polyester resins to which thermotropic polymers have been added may be cured with a smaller quantity of copolymerizable monomer for a given viscosity of the unsaturated polyester and are useful for the production of moulded parts and grouting and filling compositions which have wide applications in the building industry, the electrical industry, boat building, medical technology and the motor vehicle industry.

7 Claims, No Drawings

UNSATURATED POLYESTER RESINS CONTAINING THERMOTROPIC POLYMERS, A PROCESS FOR THEIR PREPARATION AND THEIR USE FOR THE PRODUCTION OF MOULDED BODIES

This application is a continuation of application Ser. No. 142,453, filed Jan. 11, 1988, now abandoned.

This application is a continuation of application Ser. No. 142,453, filed Jan. 11, 1988, now abandoned.

The present invention relates to mixtures of unsaturated polyester resins and thermotropic polymers, to a process for their preparation and to their use for the production of moulded bodies. The mixtures according to the invention are eminently suitable as casting resins and as resin components of moulding compounds and patching and filling compounds.

Unsaturated polyester resins, i.e. mixtures of $\alpha,\beta$-ethylenically unsaturated polyester resins and monomers which can be copolymerised therewith, are widely used as valuable resin bases for constructional materials (moulding compounds) and coatings (coating compounds). The copolymerisable monomer most commonly used in practice is styrene. Although this monomer is built into the polymer network in the process of curing it is liable to be discharged into the atmosphere before curing owing to its high vapour pressure and cause damage due to its toxicity. A reduction in the quantity of copolymerisable monomers used would therefore be desirable.

It has now surprisingly been found that for a given viscosity of the unsaturated polyester, a considerably smaller quantity of copolymerisable monomer is sufficient if thermotropic polymers are added.

The present invention therefore relates to mixtures of

I) from 10 to 90% by weight, preferably from 30 to b 70% by weight, of unsaturated polyester resin and II) from 90 to 10% by weight, preferably from 70 to 30% by weight, of thermotropic polymer, the percentages given being based on the sum of I+II.

Unsaturated polyester resins I in the context of this invention consist of

A) from 30 to 95 parts by weight, preferably from 50 to 90 parts by weight of unsaturated polyesters and B) from 70 to 5 parts by weight, preferably from 40 to 10 parts by weight of monomers which are copolymerisable with A).

Preferred $\alpha,\beta$-unsaturated polyesters A) include the conventional polycondensation products of at least one $\alpha,\beta$-ethylenically unsaturated dicarboxylic acid generally having 4 or 5 carbon atoms or ester forming derivatives thereof, e.g. its anhydrides, optionally in admixture with up to 200 mol-%, based on the unsaturated acid component, of at least one aliphatic dicarboxylic acid having from 4 to 10 carbon atoms or of a saturated or unsaturated cycloaliphatic, araliphatic or aromatic dicarboxylic acid having from 8 to 10 carbon atoms or the ester forming derivatives thereof, with at least one polyhydroxyl compound, in particular a dihydroxyl compound having from 2 to 8 carbon atoms: in other words, polyesters of the kind described by J. Björksten et al., in "Polyesters and their Applications", Reinhold Publishing Corp., New York 1956.

Maleic acid, maleic acid anhydride and fumaric acid are examples of preferred unsaturated dicarboxylic acids and derivatives thereof but other acids, e.g. mesaconic acid, citraconic acid, itaconic acid or chloromaleic acid, may also be used. The following are examples of aliphatic, saturated or unsaturated cycloaliphatic, araliphatic or aromatic dicarboxylic acids optionally used and of their derivatives: Phthalic acid and phthalic acid anhydride, isophthalic acid, terephthalic acid, hexa- and tetra-hydrophthalic acid and anhydrides thereof, endomethylene tetrahydrophthalic acids and their anhydrides, succinic acid and succinic acid anhydride and succinic acid esters and chlorides, adipic acid and sebacic acid. Hexachloroendomethylene tetrahydrophthalic acid, tetrachlorophthalic acid or tetrabromophthalic acid, for example, may be used for producing flame-resistant resins. Examples of suitable dihydric alcohols include ethylene glycol, propane-1,2-diol, propane-1,3-diol, diethylene glycol, dipropylene glycol, butane-1,3-diol, butane-1,4-diol, neopentyl glycol, hexane-1,6-diol, 2,2-bis-(4-hydroxycyclohexyl)-propane, bis-alkoxylated bisphenol A, perhydro-bis-phenol, and others. Ethylene glycol, propane-1,2-diol, diethylene glycol and dipropylene glycol are preferred.

Further modifications are possible by using monohydric, trihydric or tetrahydric alcohols having from 1 to 6 carbon atoms, such as methanol, ethanol, butanol, allyl alcohol, benzyl alcohol, cyclohexanol and tetrahydrofurfuryl alcohol, trimethylolpropane, glycerol and pentaerythritol or mono-, di- and triallylethers and benzyl ethers of trihydric or higher hydric alcohols having from 3 to 6 carbon atoms according to DE-AS 1 024 654, e.g. trimethylol propane diallylether, and by the incorporation of monobasic acids such as benzoic acid or acrylic acid.

The unsaturated polyesters A may also be Diels-Alder reaction products of polyester precondensates and dienes, e.g. dicyclopentadiene. Polyesters of this type have been described, for example, by I. R. Lawrence in "Polyester Resins", Reinhold Publ. Corp., New York 1960, page 18 et seq. and in Kunststoff-Handbuch Vol. VIII ("Polyester"), Carl Hanser Verlag, Munich 1973, pages 247–312.

The acid numbers of the polyesters A are generally from 10 to 100, preferably from 20 to 70, and the OH numbers from 10 to 150, preferably from 20 to 100, and the number average molecular weights $\overline{M}n$ are from 500 to 5000, preferably from about 1000 to 3000 (determined by vapour pressure osmometry in dioxane and acetone; when different results are obtained, the lower figure is regarded as correct).

Suitable unsaturated monomers B for copolymerisation with the unsaturated polyesters A include the unsaturated compounds conventionally used in the technology of polyesters, preferably compounds containing $\alpha$-substituted vinyl or vinylidene groups or $\beta$-substituted allyl groups, styrene being preferred but styrenes which are chlorinated, alkylated or alkenylated in the nucleus, for example, may also be used, and the alkyl groups in these compounds may contain from 1 to 4 carbon atoms. The following are specific examples: Vinyltoluene, divinylbenzene, $\alpha$-methylstyrene, tert.-butylstyrene and chlorostyrenes; vinyl esters of carboxylic acids with 2 to 6 carbon atoms, preferably vinyl acetate, vinyl propionate, vinyl benzoate, vinyl pyridine, vinyl naphthalene, vinyl cyclohexane, acrylic acid and methacrylic acid and/or their esters (preferably vinyl, allyl or methallyl esters) having from 1 to 4 carbon atoms in the alcohol component, their amides and nitriles; maleic acid anhydride or semiesters and diesters of maleic acid with 1 to 4 carbon atoms in the alcohol component; semiamides and diamides or cyclic imides such as butyl acrylate, methyl methacrylate, acrylonitrile, N-methylmaleiimide and N-cyclohexylmaleimide; allyl compounds such as allyl benzene and allyl esters such as allyl acetate, diallyl phthalate, diallyl isophthalate, diallylfumarate, allyl carbonates, diallyl carbonates, triallyl phosphate and triallyl cyanurate.

Substances are regarded as thermotropic if they form liquid-crystalline melts. Thermotropic polymers are well known, see e.g. E. E. McFarlane et al, Liquid Crystal Polymers II, Contemporary Topics in Polymer Science, Vol. 2, Plenum Publishing Corporation, 1977;

W. J. Jackson and H. F. Kuhfuss, J. Polymer Science Polymer Chem. Ed. 14, 2042 (1976);

W. C. Wooten et al. in "Ultra-high Modulus Polymers", by A. Ciferri, Applied Science Publ., London 1979, page 362 et seq;

A. Blumstein et al, "Liquid Crystalline Order in Polymers", Academic Press 1978;

J. Preston, Angew. Makromol. Chem. 109/110, pages 1-19 (1982);

A. Ciferri, W. R. Krigbaum and R. B. Meyer "Polymer Liquid Crystals", Academic Press, New York, 1982;

P. J. Flory, I. Uematsu, S. P. Papkov, CH. Ober and R. W. Lenz, Advances in Polymer Science 59 (1984);

B. Wunderlich, J. Grebowicz, M. G. Dobb, J. McIntyre, H. Finkelmann, G. Rehage, V. P. Shibaev and N. Plate, Advances in Polymer Science 60/61 (1984);

EP 1185, 1340, 8855, 11640, 15856, 17310, 18145, 18709, 22 344, 44205 and 49615;

U.S. Pat. Nos. 3,991,013, 3,991,014, 4,066,620, 4,067,852, 4,083,829 and 4,107,143;

U.S. Pat. Nos. 3,991,013, 3,991,014, 4,066,620, 4,067,852, 4,083,829 and 4,107,143;

WO 79/797, 79/1034 and 79/1040.

The liquid-crystalline state of polymer melts may be investigated by means of a polarisation microscope. For the investigation, the eyepiece was equipped with an attachment containing a photo diode at the focal point of the ocular lens. A measurement amplifier with control device was attached to adjust the measured value to 100 divisions on a scale when the microscope was switched on in the absence of a material sample and with Nicol prisms arranged in parallel. A value of 0.01 scale divisions was then obtained with crossed Nicol prisms.

The layer thickness of the polymer melts investigated was 100 $\mu$m.

Investigation of the polymers was carried out after the samples had been melted at temperatures from 200° to 400° C. If over the whole range of investigation or a part thereof the melt was found to become brighter between the crossed Nicol prisms, the polymer was classified as thermotropically liquid-crystalline.

In the measuring arrangement, the liquid-crystalline polymers show values above one scale division, in most cases values from 3 to 90 scale divisions, whereas amorphous melts. e.g. aromatic polycarbonates, gave values of less than 0.1 scale division.

The method described above is particularly suitable for rapid determination in the laboratory and gives unequivocal results in almost all cases. In cases of doubt, it may be advisable to confirm the presence of liquid-crystalline components by means of X-ray small angle scattering in the melt, as described, for example, by G. W. Gray and P. A. Windsor in "Plastic Crystals, Physico-Chemical Properties and Methods of Investigation", in particular in Chapter 3, John Wiley and Sons, New York, Sydney, Toronto 1974.

Thermotropic polymers which may suitably be used in the form of fibres or powders in the mixtures according to the invention include thermotropic polyesters, polyester carbonates, polyester amides, polyester imides, polythiol esters, polyazomethines and thermotropic cellulose derivatives such as, for example, hydroxypropyl cellulose.

Thermotropic polycondensates II may be prepared, for example, from the following compounds:

o-, m- or p-Hydroxy-benzoic acid,
hydroquinone,
hydroquinones substituted with halogen, $C_1$- to $C_3$-alkyl or phenyl,
hydroxy-naphthalene carboxylic acids,
isophthalic acid,
terephthalic acid,
naphthalene dicarboxylic acid, .
4,4'-dihydroxy-diphenyl,
4,4'-dihydroxy-stilbene,
1,2-bis-(p-carboxy-phenoxy)-ethane,
4,4'-dihydroxy-phenylether,
4,4'-diphenylether-dicarboxylic acid, resorcinol,
4,4'-benzophenone-dicarboxylic acid,
4,4'-dihydroxy-diphenylsulphide,
4,4'-dihydroxy-diphenylsulphone,
2,5-furan-dicarboxylic acid,
4,4'-bis-(p-hydroxy-phenoxy)-diphenylether,
1,2-bis-(p-hydroxyphenyl)-ethane, dihydroxy-anthraquinones,
4,4'-hydroxy-diphenylether-carboxylic acid, azobenzene-dicarboxylic acid,
bisphenol-A,
ethylene glycol, hexane-1,6-diol, adipic acid, sebacic acid and carbonic acid.

Not all combinations of the starting materials listed above give rise to thermotropic polycondensates. The man of the art will make his choice on the basis of the literature references given above or will proceed empirically on the basis of his own experience. Since the thermotropic polycondensates II are known compounds, a detailed discussion may be omitted here.

Preferred thermotropic polymers II include fully aromatic polyesters and fully aromatic polyester carbonates. Polyesters and polyester carbonates of this type are known; see DE-OS 33 25 704 = U.S. Pat. No. 4,579,934,
DE-OS 33 25 705 = U.S. Pat. No. 4,564,669,
DE-OS 33 25 703 = U.S. Pat. No. 4,603,190,
DE-OS 33 25 787 = U.S. Pat. No. 4,536,561,
DE-OS 34 15 530 = U.S. Pat. No. 4,600,764,
DE-OS 34 19 794, 34 27 886, 35 02 378, 35 17 270 and 35 17 948.

The thermotropic polyester carbonates II may contain up to 40 mol-% of carbonate groups, preferably from 25 to 35 mol-%. based on the sum of ester groups and carbonate groups.

Preferred thermotropic polyester carbonates II include those based on a) (optionally substituted) p-hydroxybenzoic acid,
b) diphenol,
c) carbonic acid and optionally
d) aromatic dicarboxylic acids, in which a proportion of the diphenol groups (b) are present in the form of 4,4'-dihydroxy-biphenyl groups (e) and the following rules apply to the molar ratios of the groups, apart from the end groups:

$a + b = 1$
$b = c + d$, from 0.1 to 0.9, preferably from
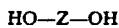 = 0.11 to 0.7, in particular from
0.125 to 0.4 and $\dfrac{c}{c + d}$ = from 0.6 to 1;

a = from 0.4 to 0.8, preferably from 0.6 to 0.75,
b−e = from 0.02 to 0.53, preferably from 0.06 to 0.36, in particular from 0.1 to 0.35,
c = from 0.12 to 0.6, preferably from 0.175 to 0.4,
d = from 0 to 0.24, preferably from 0 to 0.12, and
e = from 0.02 to 0.53, preferably from 0.0275 to 0.28, in particular from 0.03 to 0.16.

Preferred (a) p-hydroxybenzoic acids are p-hydroxbenzoic acids substituted on the nucleus by $C_1$-$C_4$-alkyl, $C_1$-$C_4$-alkoxy, $C_6$-$C_{10}$-aryl or $C_6$-$C_{10}$-alkylaryl (such as phenyl, tolyl or naphthyl), or halogen (preferably chlorine or bromine), the following being examples: 4-Hydroxy-2-methyl-benzoic acid, 4-hydroxy-3-methylbenzoic acid, 2-ethyl-4-hydroxy-benzoic acid, 3-ethyl-4-hydroxy-benzoic acid, 2- or 3-chloro-4-hydroxy-benzoic acid, 4-hydroxy-2-phenyl-benzoic acid and 4-hydroxy-3-phenyl-benzoic acid, but unsubstituted p-hydroxybenzoic acid is preferred.

Preferred (b) diphenols are compounds corresponding to the formula

HO—Z—OH    (I)

wherein Z denotes a divalent mononuclear or multinuclear aromatic group having from 6 to 30 carbon atoms and the structure of Z is such that the two OH groups are each directly attached to a carbon atom of an aromatic system, e.g.

(1) Hydroquinone, methylhydroquinone, ethylhydroquinone, 1,4-dihydroxynaphthalene, 1,5-dihydroxynaphthalene and 2,6-dihydroxynaphthalene, which do not result in significant angulation of the polycondensate chain, and (2) compounds which contribute to considerable angulation of the polycondensate chain, e.g. resorcinol, 1,6-dihydroxynaphthalene, 2,5-dihydroxynaphthalene, 2,7-dihydroxynaphthalene and bisphenols corresponding to the formula

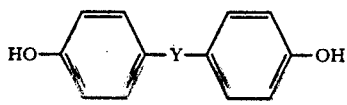  (II)

wherein Y denotes an alkylene or alkylidene group having from 1 to 7 carbon atoms, a cycloalkylene or cycloalkylidene group having from 5 to 12 carbon atoms, O, S,

$SO_2$ or

and derivatives thereof which are alkylated or halogenated on the nucleus, e.g.

bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
4,4'-bis-(hydroxyphenyl)-diisopropylbenzenes, and the corresponding compounds which are alkylated or halogenated on the nucleus, the following being specific examples:

bis-(4-hydroxyphenyl)-methane,
1,1-bis-(4-hydroxyphenyl)-ethane,
bisphenol A,
1,1-bis-(4-hydroxyphenyl)-cyclohexane,
bis-(4-hydroxyphenyl)-sulphone,
4,4'-dihydroxy-diphenylether and
4,4'-dihydroxy-diphenylsulphide.

It is advisable to select the diphenols so that not more than 30 mol-%, based on the total quantity of diphenol residues, are diphenol residues of group (2). A high proportion of diphenol residues of group (2) is acceptable in particular if it is "compensated" by additional straight chained groups such as terephthalic acid groups.

Preferred derivatives for incorporation of the (c) carbonate groups include phosgene and diarylcarbonates, e.g. diphenylcarbonate, ditolylcarbonate, phenyltolyl carbonate, dinaphthyl carbonate, dialkyl carbonates such as diethyl carbonate, dimethyl carbonate, dimethyl dicarbonate and diethyl dicarbonate, glycol carbonate and chloroformic acid esters.

Preferred (d) aromatic dicarboxylic acids have from 8 to 24, preferably from 8 to 14 carbon atoms and may be substituted with up to 4 $C_1$-$C_4$-alkyl groups, $C_1$-$C_4$-alkoxy groups or halogen atoms (preferably chlorine or bromine) per aromatic ring. e.g. naphthalene-1,4-dicarboxylic acid, diphenyl-2,2'-dicarboxylic acid, diphenyl-4,4'-dicarboxylic acid, diphenylmethane-4,4'-dicarboxylic acid, diphenylether-4,4'-dicarboxylic acid and diphenylsulphone-4,4'-dicarboxylic acid, preferably terephthalic acid, isophthalic acid or naphthalene-2,6-dicarboxylic acid and the nuclear-substituted derivatives thereof.

The thermotropic polyesters of polyester carbonates II may contain H, OH, $OC_6H_5$ or groups derived from chain breakers as end groups.

The thermotropic polyesters and polyester carbonates II may contain the residues of compounds (a) to (e) in random distribution or in blocks.

The thermotropic polyesters and polyester carbonates may be prepared by various methods, e.g. by condensation of carboxylic acid chlorides or by esterification of carboxylic acid aryl esters with phenolic compounds followed by polycondensation. The carboxylic acid chlorides may be produced in situ from the corresponding carboxylic acids and chlorinating agents. When esterification followed by polycondensation is carried out, phenol is distilled from the reaction mixture until the desired degree of condensation has been reached.

Conventional additives such as fillers, reinforcing substances, pigments, accelerators, brightening agents, thixotropicizing agents and stabilizers such as hydroquinone or derivatives thereof may also be added to the mixtures according to the invention.

For the preparation of moulding compounds, from 50 to 350%, based on polyester resins A+B, of fillers and reinforcing agents such as chalk, talc, baryta, aerosil or glass fibres may be added to the mixtures according to the invention. Dyes or pigments may, of course, also be added. The various components of the mixtures according to the invention may suitably be mixed in kneaders or dissolvers or in rolling mills.

Polymerisation initiators, preferably diacylperoxides or percarbonates, may be added to the mixtures according to the invention in quantities of from 1 to 10% by weight, based on polyester resin A+B. before curing takes place. Preferred initiators include, for example, peroxides and percarbonates such as diacetylperoxide, dibenzoyl peroxide, di-p-chlorobenzoylperoxide, phthaloylperoxide, succinylperoxide, dilaurylperoxide, acetylcyclohexane sulphonylperoxide, isopropylpercarbonate, cyclohexyl percarbonate and bis-(4-tert.-butylcyclohexyl)-percarbonate.

The mixtures according to the invention and the compositions prepared from them may be cured at temperatures of from $-15°$ C. to $+120°$ C., preferably at $0°$ C. to $90°$ C., or they may be cured at room temperature if they have been precatalysed.

Moulding and casting compounds prepared from the mixtures according to the invention are suitable in particular for the production of moulded parts and grouting and filling compositions which have wide applications in the building industry, the electrical industry, boat building, medical technology and the motor vehicle industry.

DESCRIPTION OF THE EXPERIMENTS

Preparation of the Unsaturated Polyester Resins

UP 1

An unsaturated polyester is obtained from 3265 g of diethylene glycol. 478 g of ethylene glycol and 3596 g of maleic acid anhydride by conventional melt condensation with the addition of 1545 g of dicyclopentadiene. After it has been mixed with styrene, this unsaturated polyester has the following characteristics:

Solids content: 62%.
Acid number: 12 mg KOH/g.
Viscosity: 500 mPa.s.

UP 2

An unsaturated polyester is obtained from 1458 g of ethylene glycol, 798 g of 1,2-propylene glycol, 3012 g of trimethylolpropane diallylether, 3102 g of maleic acid anhydride, 521 g of phthalic acid anhydride, 55 g of methanol and 550 g of an ester of maleic acid and trimethylolpropane-diallylether by the conventional method of melt condensation. This unsaturated polyester is dissolved in styrene.

Solids content: 75%.
Acid number: 20 mg KOH/g.
Viscosity: 2600 mPa.s.

UP 3

An unsaturated polyester is prepared from 3028 g of 1,2-propylene glycol, 1620 g of dipropylene glycol, 3838 g of maleic acid anhydride and 1175 g of phthalic acid anhydride by conventional melt condensation. When mixed with styrene, this unsaturated polyester has the following characteristics:

Solids content: 75%.
Acid number: 18 mg KOH/g.
Viscosity: 1600 mPa.s.

UP 4

Method as for UP 2 but with the following characteristics:

Solids content: 85%.
Acid number: 20 mg KOH/g.
Viscosity: 14.000 mPa.s.

Preparation of the Thermotropic Polyester 194 g of p-hydroxybenzoic acid, 48.6 g of hydroquinone, 40.7 g of 4,4'-dihydroxybiphenyl, 17.1 g of terephthalic acid, 0.55 g of zinc(II) acetate and 487.6 g of diphenyl carbonate were heated to $250°$ C. in a reaction vessel equipped with stirrer and distillation bridge.

After the temperature had been raised to $295°$ C. and the distillation rate reduced, a vacuum of $0.5 \times 10^{-3}$ bar was slowly applied within one hour at this temperature and the reaction mixture was after-condensed for one hour.

Preparation of Moulding Compounds

Moulding compounds having the properties summarized in Table 1 were prepared from 50 g of unsaturated polyester resin, 1 g of an amine accelerator prepared from dipropoxy-p-toluidine and adipic acid, 1.15 g of benzoyl peroxide paste (50%) and 63.5 g of thermotropic polyester or filler.

TABLE 1

| | | Properties of moulding compounds | | | |
|---|---|---|---|---|---|
| Moulding compound | UP resin | Thermotropic polymer; filler | Fluidity before curing | Colour after curing | Surface |
| I | UP 1 | thermotropic polyester | pourable | light beige | dry |
| II | UP 2 | thermotropic polyester | " | " | " |
| III | UP 3 | thermotropic polyester | " | " | " |
| IV | UP 4 | thermotropic polyester | " | " | " |
| V | UP 1 | talc powder | not pourable | green | tacky |
| VI | UP 2 | " | " | " | tacky |

TABLE 1-continued

| Moulding compound | UP resin | Properties of moulding compounds | | | |
| --- | --- | --- | --- | --- | --- |
| | | Thermotropic polymer; filler | Fluidity before curing | Colour after curing | Surface |
| VII | UP 3 | " | " | " | dry |
| VIII | UP 4 | " | " | " | tacky |
| IX | UP 2 | chalk | " | yellowish | tacky |
| X | UP 4 | " | " | " | tacky |

Experiments I to IV are according to the invention. V to X are comparison experiments.

The properties of the moulding compounds according to the invention differ clearly from those obtained in the comparison experiments.

Moulding compounds IX and X cure spontaneously after the addition of benzoyl peroxide so that the plasticity cannot be assessed. Both moulding compounds are still pourable prior to the addition of peroxide.

We claim:

1. Mixtures pourable before curing of
   I) from 10 to 90% by weight of unsaturated polyester resin and
   II) from 90 to 10% by weight of thermotropic polymer in powder form, the percentages being based on the sum of I+II.

2. Mixtures according to claim 1 of
   I) from 30 to 70% by weight of unsaturated polyester resin and
   II) from 70 to 30% by weight of thermotropic polymer.

3. Mixtures according to claim 1 in which the polyester resin I consists of
   A) from 30 to 95 parts by weight of unsaturated polyester and
   B) from 70 to 5 parts by weight of unsaturated monomer copolymerizable with A.

4. Mixtures according to claim 1 in which the polyester resin I consists of
   A) from 50 to 90 parts by weight of polyester and
   B) from 50 to 10 parts by weight of copolymerizable unsaturated monomers.

5. Process for the preparation of the mixtures according to claim 1 which comprises mixing and combining components I) and II).

6. Moulded articles which comprise the mixture as claimed in claim 1.

7. Mixtures according to claim 1 wherein the thermotropic polymer II is a fully aromatic polyester containing carbonate linkages or a fully aromatic polyester free from carbonate linkages.

* * * * *